(12) United States Patent  
Kao et al.

(10) Patent No.: US 6,592,098 B2  
(45) Date of Patent: Jul. 15, 2003

(54) MICROVALVE (75) Inventors: Imin Kao, Stony Brook, NY (US);  
Robert P. Wong, Huntington, NY (US);  
Thomas J. Cassar, St. James, NY (US)

(73) Assignee: The Research Foundation of SUNY, Stony Brook, NY (US)

( * ) Notice: Subject to any disclaimer, the term of this patent is extended or adjusted under 35 U.S.C. 154(b) by 0 days.

(21) Appl. No.: 09/982,722

(22) Filed: Oct. 18, 2001

(65) Prior Publication Data  
US 2002/0043638 A1 Apr. 18, 2002

Related U.S. Application Data  
(60) Provisional application No. 60/241,390, filed on Oct. 18, 2000.

(51) Int. Cl.$^7$ .......................... F16K 31/00; F16K 51/00  
(52) U.S. Cl. ..................................... 251/129.01; 251/11  
(58) Field of Search ................................ 251/11, 129.01

(56) References Cited

U.S. PATENT DOCUMENTS

| | | |
|---|---|---|
| 2,394,911 A | 2/1946 | Griswold |
| 2,638,127 A | 5/1953 | Griswold |
| 3,468,342 A | 9/1969 | Craft |
| 3,881,686 A | 5/1975 | Hirmann |
| 3,897,041 A | 7/1975 | Cowan |
| 4,083,379 A | 4/1978 | Aus der Au et al. |
| 4,190,045 A | 2/1980 | Bartels |
| 4,210,310 A | 7/1980 | Kay |
| 4,241,756 A | 12/1980 | Bennett et al. |
| 4,581,624 A * | 4/1986 | O'Connor .............. 251/129.06 |
| 4,664,146 A | 5/1987 | Carter |
| 4,981,157 A | 1/1991 | Denkinger |
| 5,058,856 A * | 10/1991 | Gordon et al. ................. 251/11 |
| 5,069,419 A * | 12/1991 | Jerman ................... 251/129.01 |
| 5,076,322 A | 12/1991 | Choksi et al. |
| 5,161,774 A | 11/1992 | Engelsdorf et al. |
| 5,161,775 A | 11/1992 | Miller |

(List continued on next page.)

FOREIGN PATENT DOCUMENTS

WO      WO 00/39467      7/2000

OTHER PUBLICATIONS

Redwood MicroSystems, Inc., http://www.redwoodmicro.com/nc15002.htm, "NC–1500 Fluistor Microvalve," Technical Data, pp. 1–3.  
International Preliminary Examination Report (IPER), Feb. 14, 2003, International App. No. PCT/US01/32594.

Primary Examiner—Paul J. Hirsch  
(74) Attorney, Agent, or Firm—Snell & Wilmer (57) ABSTRACT An improved microvalve device is configured to provide a more robust and durable operation to withstand the demands of various operating environments. The microvalve may comprise a valve seat and a diaphragm, with the diaphragm operated by an external actuator device, such as a bladder, through various mechanisms of actuation, such as direct and indirect mechanisms, that are separate from the microvalve. Through use of the various mechanisms of actuation, the actuator device is configured to apply forces on the diaphragm to suitably move the diaphragm to open and close the microvalve. The valve seat and diaphragm can be configured to provide the microvalve with a plurality of openings configured to permit flow therebetween. In addition, the microvalve may be configured to facilitate uni-directional or bi-directional flow. Further, a plurality of microvalves can be cascaded together in a parallel and/or series configuration, with each valve having similar or different flow characteristics, and being selectively operated. The microvalve can also include a combination gate valve configuration and a bladder configuration to provide high frequency response characteristics in addition to stability and reduction in leak flow.

36 Claims, 5 Drawing Sheets

U.S. PATENT DOCUMENTS

| | | | |
|---|---|---|---|
| 5,333,831 A | * 8/1994 | Barth et al. | 251/129.01 |
| 5,441,231 A | 8/1995 | Payne et al. | |
| 5,529,279 A | * 6/1996 | Beatty et al. | 251/129.01 |
| 5,541,016 A | 7/1996 | Schumm, Jr. | |
| 5,647,574 A | 7/1997 | Mettner et al. | |
| 5,681,024 A | 10/1997 | Lisec et al. | |
| 5,727,594 A | 3/1998 | Choksi | |
| 5,785,295 A | 7/1998 | Tsai | |
| 5,810,325 A | 9/1998 | Carr | |
| 5,857,661 A | 1/1999 | Amada et al. | |
| 6,114,794 A | * 9/2000 | Dhuler et al. | 310/307 |
| 6,129,331 A | 10/2000 | Henning et al. | |

* cited by examiner

FIG. 7

MICROVALVE

CROSS-REFERENCE TO RELATED APPLICATION

This application is based on and claims priority to U.S. Provisional Application Ser. No. 60/241,390, filed Oct. 18, 2000, hereby incorporated by reference in its entirety.

TECHNICAL FIELD

The present invention relates, generally, to microvalves, and in particular to an improved microvalve device configured to provide a more robust and durable operation to withstand the demands of various operating environments.

BACKGROUND OF THE INVENTION

Micro Electro Mechanical Systems (MEMS) are an emerging technology used to fabricate working mechanisms on a micro-miniature scale. Typically MEMS devices can be divided between two categories: sensors and actuators. MEMS sensor devices include, for example, the accelerometers used to deploy airbags, pressure sensors, and even chemical sensors. MEMS actuator devices can be configured for applications such as, for example, fluid flow control in microvalves or the control of optical signals utilizing micro-mirrors and other like devices.

MEMS valves comprise micro-fabricated devices typically having a size of a few $\mu$m to a mm and which are configured to admit, restrict or block the flow of fluid, including air, gas and liquid. Typically, existing microvalve devices suffer from various problems, including a lack of robustness and durability, or quite often from insufficient fluid flow properties, such as flow rate, operating pressure, and limitations on the types of fluid that can be used (e.g., most microvalves only admit air). More recently developed microvalves, including gate valve designs and diaphragm designs, have attempted to address the above problems.

Figure 1:
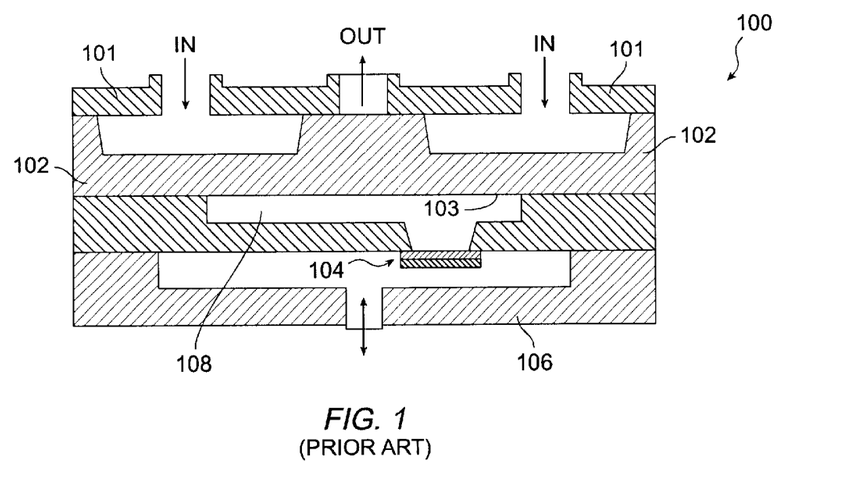
FIG. 1 illustrates a prior art pressure differential diaphragm valve design.

Microvalves using a diaphragm design actuated by the pressure differential across both sides of the diaphragm, for example, valve 100 illustrated in FIG. 1, generally comprise a cover plate 101, a valve plate 102 having a diaphragm 103, a control gate 104 with a closure plate, and a lower substrate 106. Diaphragm valve 100 uses a pressure differential across both sides of diaphragm 103 to produce the movement of diaphragm 103 in order to block or free the fluid passage way. The pressure differential is regulated by control gate 104 by activation of the closure plates to regulate the pressure differential through controlling the pressure within a pressure control chamber 108.

While providing more durability and potentially less power consumption, such pressure balance microvalves usually offer a nonlinear response, provide a poor flow rate performance, require additional wafer bondings, and are more costly to manufacture. For example, because of the structure of diaphragm 103, a large differential pressure is generally necessary to actuate pressure balanced valve 100. In addition, due to the structure of diaphragm 103 and the flow passageway, the available flow rate is limited. For example, due to a steeply inclined boss component on diaphragm 103, fluid flow through the passageway from the inlet orifices to the outlet orifices produces nonlinear flow characteristics, as well as cavitation. Such a steeply inclined boss component is mainly due to current bulk-micromachining techniques currently available, which limit the slope of the boss component to 54.7° angle of inclination. Moreover, in that pressure control chamber 108 is regulated by the small control gate 104, typically comprising a gate or bimorph-type valve, leaks within control gate 104 often occur, i.e., control gate 104 may not always maintain the pressure (P+$\Delta$P) necessary for regulation and control of diaphragm 103. Further, in that the mechanisms for actuation for microvalve 100 are configured proximate to, or a part of, the components of microvalve 100, such as control gate 104, such a microvalve configuration unfortunately exposes the mechanisms for actuation to any fluids used within the flow passageway, such as to intermix electrical signals with conductive fluids. Still further, in that such pressure balanced microvalves generally require wafer bondings, the manufacture costs are generally high.

Other newly developed microvalves employ a gate valve design which comprise moving gates on the surface of a silicon substrate with orifices. For example, with reference to FIGS. 2A and 2B, a gate valve 200 has a gate 202 comprising a nickel flap that is actuated to move horizontally on the surface of a silicon substrate 203 which contains through orifices 204 in order to regulate flows directly. Gate 202 can include a shutter configuration 202A, or other configurations of openings, which permit regulation of air flow. In addition, gate valve 200 generally provides a greatly increased flow rate, has a faster response, and is more cost effective to fabricate than the pressure balance microvalves.

Figure 2A:
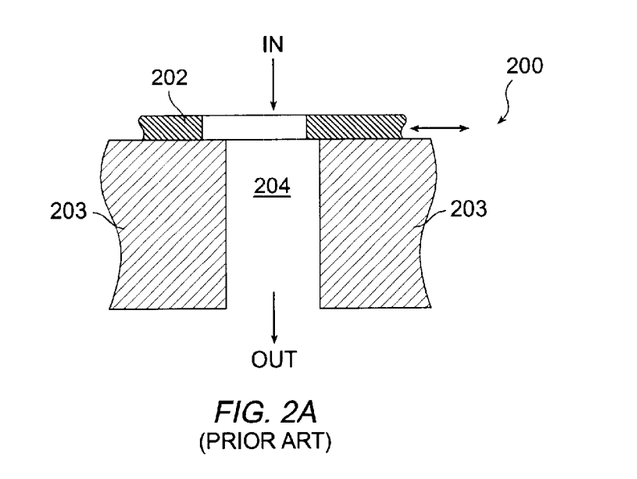
FIGS. 2A and 2B illustrate a prior art gate valve design.
Figure 2B:
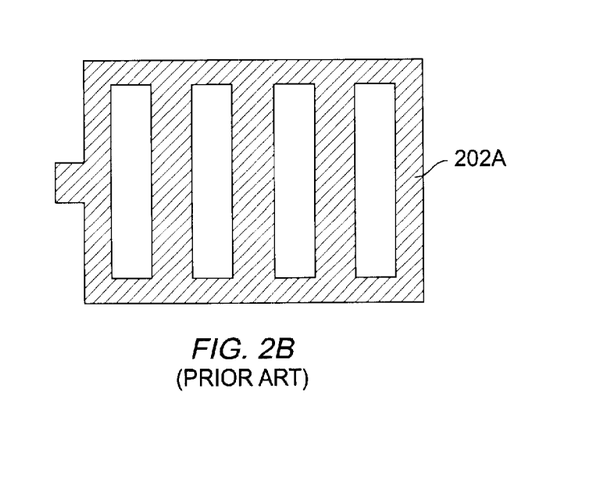

However, gate valves also have various deficiencies. For example, due to a typical polysilicon thermal actuator design, to actuate gate 202 to open or close valve 200, a large voltage is necessary, often comprising 30 volts or more. In addition, because of the microelectronic fabrication process of such microvalves, gate valves typically realize leak flow, even despite the application of electrostatic clamping devices. For example, on many occasions, the leak flow can be as high as 10–20% of the overall flow rate, and even worse on other occasions. Further, the appearance of leaks increases as the pressure of the fluid increases. Probably most problematic, due to their unidirectional flow characteristics, these gate valve designs are limited in their capability to withstand back pressures produced during their operation while interfacing with other output devices. For example, any back pressure, for example as little as 10 psi, that may be present in such a device will tend to bend the metal flap and thus fatally and permanently damage it. These back pressure problems result in leaks in the gate valve, even despite the application of electrostatic clamping devices. Still further, gate valves cannot effectively operate with a conductive fluid, e.g., water and the like, because the electronic-based actuation circuit is exposed to the conductive fluid.

Therefore, as one skilled in the art will appreciate, there exists a need for an improved MEMS microvalve device that is more robust and durable to withstand the demands of various operating environments while providing unidirectional and bi-directional fluid flow capabilities, and yet is still cost effective to manufacture.

SUMMARY OF THE INVENTION

A microvalve according to the present invention addresses many of the shortcomings of the prior art. In accordance with various aspects of the present invention, an improved microvalve device is configured to provide a more robust and durable operation to withstand the demands of various operating environments. In accordance with an exemplary embodiment of the present invention, a microvalve may comprise a valve seat and a diaphragm, with the diaphragm operated by an external actuator device through various mechanisms of actuation that are separate from the microvalve. Through use of the various mechanisms of actuation, the actuator device is configured to apply forces on the diaphragm to suitably move the diaphragm to open and close the microvalve. For example, an actuation mechanism may apply force actuated through use of an external actuator device, such as a bladder device, to move the diaphragm as intended.

In accordance with another exemplary embodiment of the present invention, the valve seat and diaphragm can be configured to provide the microvalve with a plurality of openings configured to permit flow thereinbetween. In addition, the microvalve may be configured to facilitate uni-directional or bi-directional flow. Further, in accordance with other exemplary embodiments, a plurality of microvalves can be cascaded together in a parallel and/or series configuration, with each valve having similar or different flow characteristics, and being selectively operated.

In accordance with another aspect of the present invention, the external actuator device can be suitably actuated by various means, including by direct mechanisms such as electrostatic, electromagnetic, piezoelectric, and/or by indirect mechanisms, such as thermal actuation, or by any other similar means. The separation of the mechanism of actuation from the design of microvalve mechanisms provides great flexibility in implementation of the microvalve in various applications. Such a separation of actuation mechanisms from the valve design facilitates the providing of microvalve fluid passageways without obstruction, thus resulting in increased linear flow characteristics with respect to the actuation and pressure of fluid. In addition, the separation of actuation facilitates the selection of suitably actuation mechanisms to meet the requirements with respect to response time, frequency response, applied forces, space considerations, and other design considerations. In addition, while typical microvalves are configured to work with only air, through separation of the mechanism for actuation, e.g., the separation of the fluid passageway from the actuator device, the exemplary microvalves of the present invention can operate with various types of fluids, including air, gas and liquids.

In accordance with another exemplary embodiment of the present invention, the microvalve can also include a combination gate valve configuration and a bladder configuration to provide high frequency response characteristics in addition to stability and reduction in leak flow. The gate valve can comprise various metals and other materials, such as ceramic, glass or other like materials.

BRIEF DESCRIPTION OF THE DRAWINGS

The exemplary embodiments of the present invention will be described in conjunction with the appended drawing figures in which like numerals denote like elements and.

DETAILED DESCRIPTION

The present invention may be described herein in terms of various electrical and mechanical components and various processing steps. It should be appreciated that such electrical and mechanical components may be realized by any number of hardware components configured to perform the specified functions. For example, the present invention may employ various electrical or mechanical components, e.g., sensors, microactuators, and the like, which may carry out a variety of functions under the control of one or more microprocessors or other control devices. In addition, those skilled in the art will appreciate that the present invention may be practiced in any number of electromechanical contexts and that the microvalves described herein are merely one exemplary application for the invention. Further, it should be noted that the present invention may employ any number of conventional techniques for transmission or flow of fluids and the like. Such general techniques that may be known to those skilled in the art are not described in detail herein.

As discussed above, prior art microvalve designs, including diaphragm valve and gate valve designs, have various deficiencies, such as poor flow rate performance, additional wafer bondings, large voltage requirements, leak flow, limited back pressure, among others. However, in accordance with various aspects of the present invention, an improved microvalve is provided that is more robust and durable to withstand the demands of various operating environments while providing uni-directional and bi-directional fluid flow capabilities, and yet is still cost effective to manufacture.

In accordance with an exemplary embodiment of the present invention, a microvalve may comprise a valve seat and a diaphragm, with the diaphragm operated by an external actuator device through various means of actuation that are separate from the microvalve. Through use of the various means of actuation, the actuator device is configured to apply forces on the diaphragm to suitably move the diaphragm to open and close the microvalve.

Figure 3:
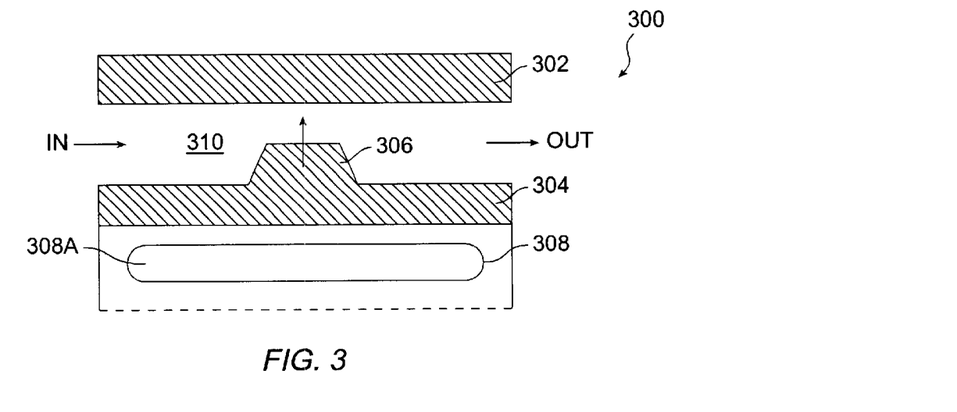
FIG. 3 illustrates an exemplary microvalve in accordance with the present invention.

For example, in accordance with an exemplary embodiment, with reference to FIG. 3, a microvalve 300 suitably comprises a valve seat 302 and a diaphragm 304. Both valve seat 302 and diaphragm 304 can comprise substrates comprised of silicon and which can be etched, using common microchip fabrication processes, to produce a passageway 310. Moreover, diaphragm 304 can comprise various metals or other materials, for example, silicon, glass, rubber or other similar materials configurable to function as a diaphragm within microvalve 300, i.e., to allow back pressure on diaphragm 304 to force movement of diaphragm towards valve seat 302 to restrict the flow of fluid passageway 310. Such materials can be suitably selected based on various design criteria, including desired back pressure, movement, and types of actuation mechanisms.

Figure 4A:
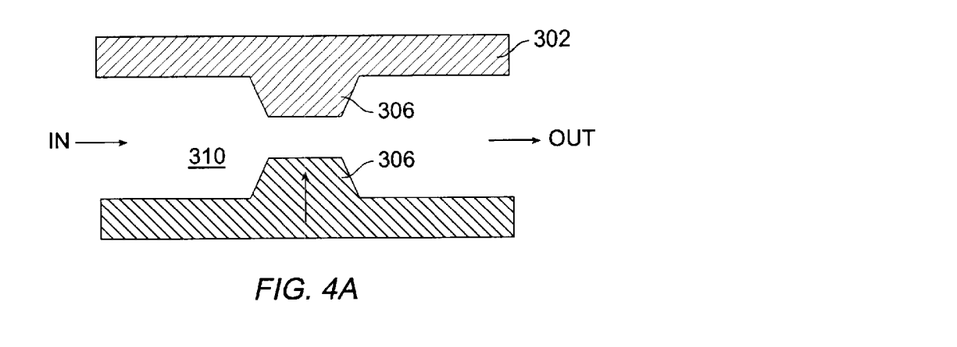
FIGS. 4A through 4C illustrate various exemplary embodiments of a microvalve in accordance with the present invention.
Figure 4B:
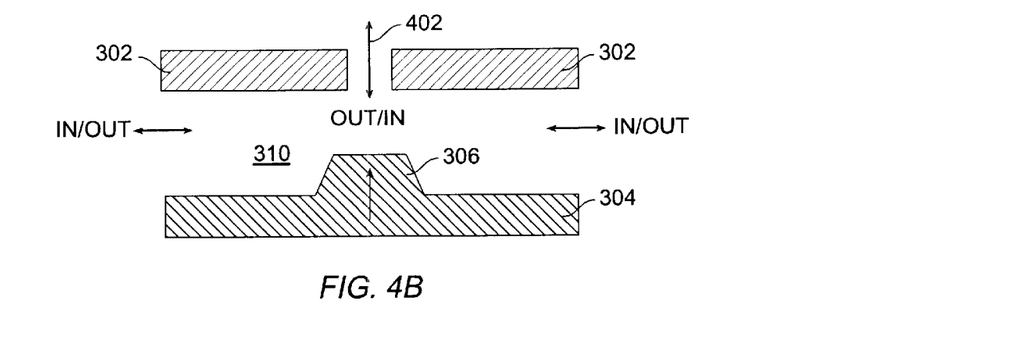
Figure 4C:
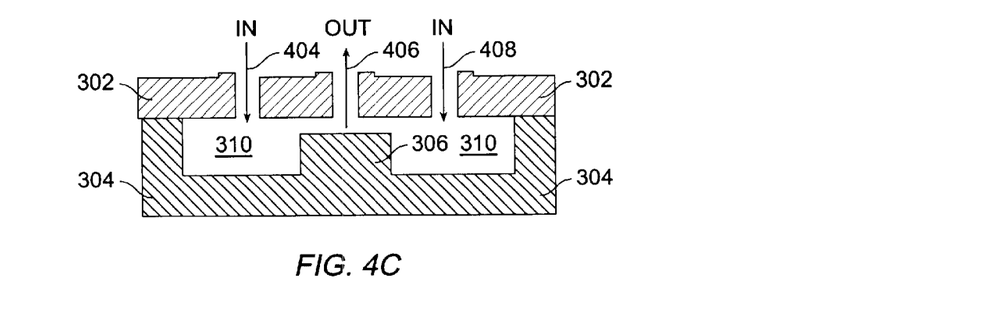

To facilitate regulation of the opening within passageway 310, and thus the available flow rate of microvalve 300, diaphragm 304 can suitably include a boss component 306 comprising a protruding portion configured for juxtaposition against the inner surface of valve seat 302 to thereby restrict flow through passageway 310. Boss component 306, as will be described in more detail below, can be configured in various dimensions, for example, as illustrated in FIG. 4B, e.g., a trapezoid configuration, and 4C, e.g., a rectangular configuration. Boss component 306 is configured to be moved towards an opposite surface, e.g., valve plate 302, to restrict the flow of fluid through passageway 310. Moreover, with reference to FIG. 4A, valve seat 302 can also be suitably configured with a boss component 306 to suitably restrict the opening within passageway 310. Accordingly, through control of the separation distance between boss component 306 and valve seat 302 or other boss component 306, regulation of passageway 310 can realized.

Figure 6A:
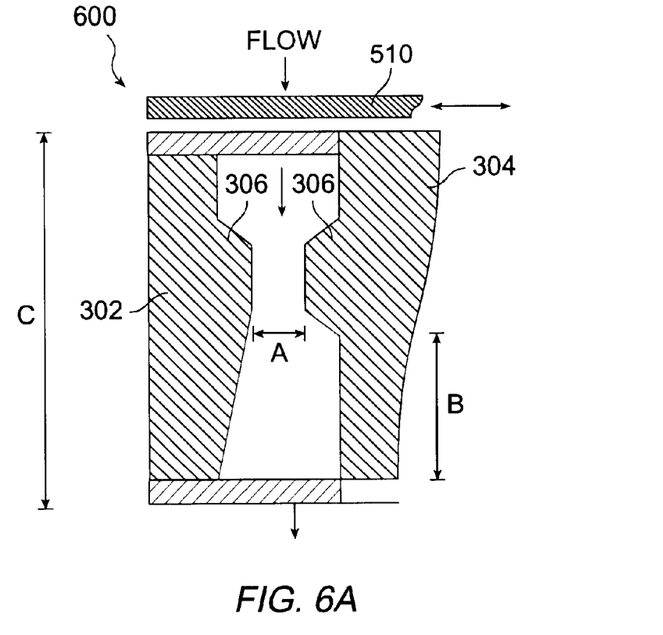
FIGS. 6A through 6C illustrate exemplary embodiments of a microvalve having a gate valve configuration, including a cross-sectional views, in accordance with other exemplary embodiments of the present invention.
Figure 6B:
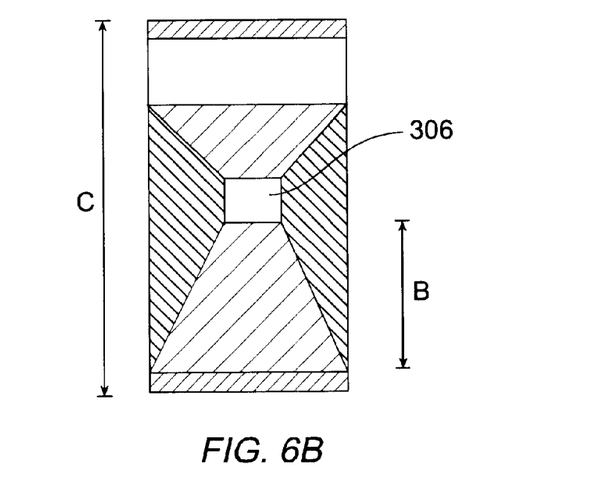
Figure 6C:
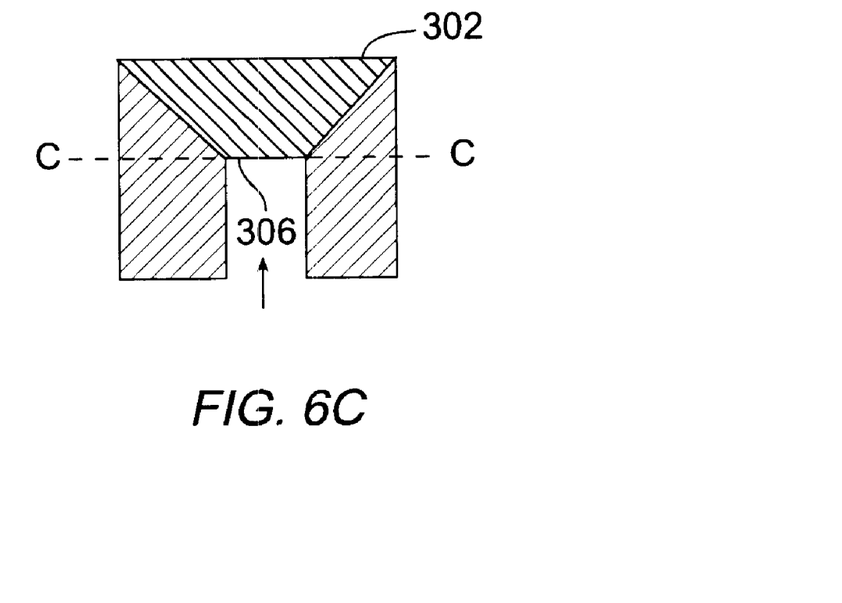

To address the problems arising from back pressure, leak flow, and flow rate regulation, various aspects can be considered in configuring boss component 306. For example, with reference to FIGS. 6A through 6C illustrating cross-sectional views including a side, internal front and top view, by increasing the separation distance "A" of boss components 306, the available flow rate is suitably increased, and the likelihood for instability is decreased; however, the force acting upon diaphragm 304 is increased, i.e., the back pressure on diaphragm 304 is increased. Likewise, decreasing the separation distance "A" of boss components 306 decreases the available flow rate, increases the likelihood for instability, but decreases the force acting upon diaphragm 304. In addition, increasing the distance "B" from boss component 306 to the outer edge of the microvalve, e.g., at the wafer bond, increases the area for back pressure on diaphragm 304 and thus requires a larger force to be enacted by an external actuator device to urge diaphragm 304 towards valve plate 302. On the other hand, decreasing the distance "B" from boss component 306 to the outer edge of the microvalve decreases the force required to urge diaphragm 304 towards valve plate 302, but also increases the stiffness of diaphragm 304. Moreover, the slope of boss component 306 is configured to facilitate the regulation of flow through passageway 310. For example, the steeper the slope of boss component 306, i.e., the greater the angle of inclination, the greater the likelihood of cavitation and hammer effects, but the easier to regulate the flow rate; meanwhile, the flatter the slope of boss component 306, the lower the possibility for cavitation and hammer effects, but the more difficult to control flow rates. Thus, the slope can be configured at 0° or 90°, from a planar surface of said diaphragm, or any slope configuration in between or approximating those parameters, such as 55°–60°. However, to minimize cavitation and hammer effects, boss component 306 is configured with less than 50°. Thus, microvalve 300 is not limited by the bulk micromachining process of prior art microvalves, which limit the angle of inclination of boss component to 54.7°. Accordingly, depending on the desired flow rate and operating characteristics, the thicknesses and widths of the various components of microvalve 300 can be suitably selected to achieve those objectives.

Figure 7:
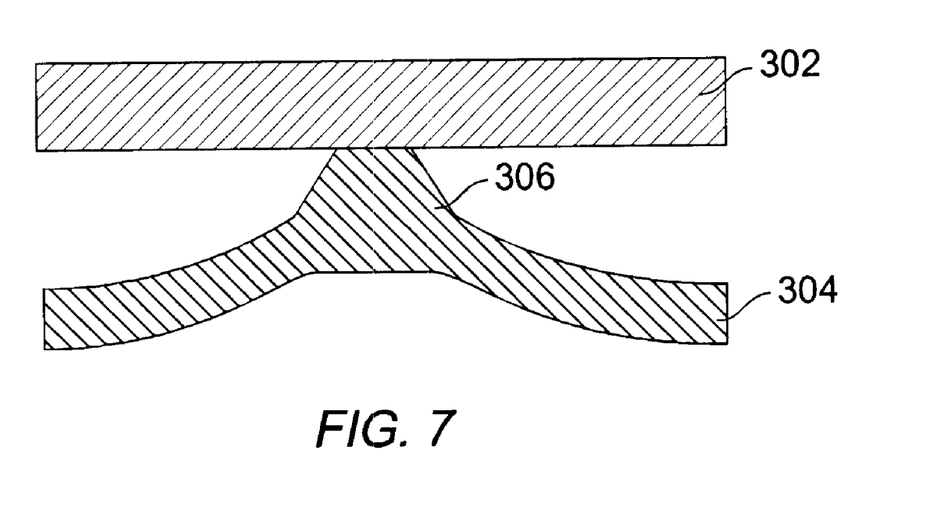
FIG. 7 illustrates an exemplary microvalve in a latched configuration in accordance with an exemplary embodiment of the present invention.

In accordance with another aspect of the present invention, to further facilitate the operation of microvalve 300, a latch and release device can be configured with valve seat 302 and/or diaphragm 304 to suitably lock diaphragm 304 in position once diaphragm 304 is suitably moved to a desired regulation position, for example, such that passageway 310 is partially open, partially closed, or completely closed. For example, with reference to FIG. 7, valve plate 302 and diaphragm 304/boss component 306 can be electrostatically charged with opposition charges, which requires very little power, causing valve plate 302 and diaphragm 304/boss component 306 to be attracted to each other. Once microvalve 300 is latched, e.g., boss component 306 is in communication or very proximate with valve plate 302, any external back pressure to diaphragm 304 can be relaxed to reduce power consumption. Moreover, any other mechanism for providing a fixed or latched position of diaphragm 304/boss component 306 with respect to valve plate 302 can be implemented. Accordingly, microvalve 300 can be configured to reduce and/or resist the impact of back pressure upon diaphragm 304.

In accordance with another aspect of the present invention, valve seat 302 and diaphragm 304 can be configured to provide microvalve 300 with a plurality of openings configured to permit flow within passageway 310. For example, in accordance with an exemplary embodiment, in addition to having a single passageway 310 defined between valve seat 302 and diaphragm 304, valve seat 302 can suitably include a single input/output orifice 402 as illustrated in FIG. 4B. Input/output orifice 402 can comprise various widths of openings through valve seat 302 to permit a fluid to pass in and/or out of orifice 402. In accordance with another exemplary embodiment, valve seat 302 can suitably include multiple input and/or output orifices as illustrated in FIG. 4C, such as one or more input orifices 404 and 408, and an output orifice 406. Input orifices 404 and 408 are configured to be in fluid communication with passageway 310 at all times, while output orifice 408 is configured to be in fluid communication with passageway 310 depending on the separation distance between boss component 306 and valve seat 302.

Further, in accordance with another aspect of the present invention, microvalve 300 may be configured to facilitate uni-directional or bi-directional flow. For example, in accordance with various exemplary embodiments, microvalve 300 can be configured with a single passageway 310 having a single input and output orifice, as illustrated in FIGS. 3 and 4A, for unidirectional flow. In addition, as illustrated in FIG. 4C, microvalve 300 can be configured with one or more input orifices, e.g., 404 and 408, and one or more output orifices, e.g., 406, configured for unidirectional flow. Further, microvalve 300 can be configured with multiple orifice configurations as illustrated in FIG. 4B, and with the flow directions within the orifices and passageway 310 can be configured to be symmetrical to facilitate bi-directional flow. Moreover, the bi-directional flow can be realized without significantly affecting the flow characteristics of microvalve 300.

In accordance with another aspect of the present invention, with reference again to FIG. 3, diaphragm 304 can be suitably actuated by an external actuator device 308 that is configured to apply a force to suitably move diaphragm 304 to open and close a passageway 310 within microvalve 300. In accordance with an exemplary embodiment, diaphragm 304 suitably comprises a flexible member that can suitably urged into juxtaposition with valve plate 302 to restrict the opening of passageway 310. External actuator device 308 is suitably configured with a bias pressure contained within that can facilitate regulation of movement of diaphragm 304. For example, a bias pressure can be contained within a fluid container, or any other like functional device. Such a bias pressure suitably provides a threshold parameter that requires a particular level of actuation from an actuation mechanism to facilitate expansion of external actuator device 308, and thus urge diaphragm 304 towards valve plate 302. Moreover, such a bias pressure is readily configurable at different levels, and can be readily preset during fabrication of microvalve 300.

In addition, external actuator device 308 is configured to be external to passageway 310, thus permitting various types of fluids within passageway 310, as well as separating the actuation mechanisms from diaphragm 304 and valve plate 302. Stated another way, external actuation device 308, and any actuation mechanisms utilized, are separate from any fluid communications through passageway 310, as well as separate from diaphragm 304 and valve plate 302.

In accordance with an exemplary embodiment, external actuator device 308 comprises a bladder configuration capable of expanding and contracting to urge diaphragm 304 into juxtaposition with valve plate 302 to regulate the opening of passageway 310. Such a bladder configuration can comprise various materials configured for expansion and contraction, include various elastic materials, such as rubber and other plastics and the like, that are configured for containing a fluid. Moreover, the bladder configuration can comprise various thicknesses, and can include an inner chamber 308A having various capacities for containing fluid. Moreover, various types of fluids can be contained within inner chamber 308A, including air, gas and liquid fluids, or even superheated fluids, such as steam.

In addition, although a bladder or any other like-functioning device is described as one exemplary external actuator device 308 for urging diaphragm 304 towards valve plate 302, other mechanisms and devices can be provided as well. Thus, a bladder or equivalent device can be suitably replaced by, for example, a thermal-pneumatic actuator device, such as that utilized within a Fluistor-brand thermal-pneumatic valve provided by Redwood Microsystems, Inc. of Menlo Park, Calif. that can be used in medical applications, or any other like devices, to effectively urge diaphragm 304 towards valve plate 302 to regulate flow through passageway 310.

In accordance with another aspect of the present invention, external actuator device 308 can be suitably actuated by various direct and indirect means. For example, external actuator device 308, such as one comprising a bladder or equivalent device, can be indirectly actuated by, for example, expansion via thermal means, or external actuator device 308 can be directly actuated by electrostatic means using dielectric layers to cause expansion of external actuator device 308. In addition, electromagnetic or piezoelectric actuation means can be utilized to suitably actuate external actuator device 308 to urge diaphragm 304 towards valve plate 302. In addition, a direct or indirect force can be applied against the outer surface of external actuator device 308 to urge external actuator device 308 towards the diaphragm 304 to deflect the diaphragm to open and close the valve opening. Further, more indirect means can be utilized, such as thermal actuation by heating up the enclosure of external actuator device 308, e.g., PV=nRT. For example, heat can be suitably applied to suitably expand a bladder or equivalent device for external actuator device 308. Moreover, other thermal means can be utilized, such as bi-morph-thermal actuation or thermal pneumatic actuation.

Regardless of the actuation mechanism utilized, external actuator device 308 can be configured to maintain a regulating position until a particular bias pressure threshold parameter is met before being urged towards or away from the diaphragm 304 in order to restrict or permit fluid flow. Accordingly, any actuation mechanism now known or hereinafter devised that can facilitate the urging of bladder or equivalent device 308 to press upon the diaphragm 304 to move towards valve plate 302 to suitably regulate the flow rate within passageway 310 can be utilized in accordance with the present invention. Moreover, the actuation mechanism is separate from the components of microvalve 300, i.e., separate from diaphragm 304, valve plate 302, and passageway 310.

In accordance with another aspect of the present invention, a plurality of microvalves 300 can be configured in a cascaded arrangement to provide a readily adaptable MEMS configuration. In an exemplary embodiment, a plurality of microvalves 300 can be configured in parallel, with each microvalve 300 selectively configurable to be actuated as necessary to regulate the flow rate within the MEMS configuration. The individual flow rates for each microvalve 300 can be configured as the same flow rate value, or can be various values. For example, for a MEMS configuration having n microvalves with a flow rate f a resulting flow rate of nf can be realized when all valves are in an "open" state. In addition, a plurality of microvalves 300 can be configured in a series, or in a series and parallel configuration. Accordingly, increasing or reducing the number of opened valves, and/or increasing or decreasing the individual flow rates, as well as the series and/or parallel configurations of the valve array, can provide various other effective total flow rates for the MEMS configuration.

In addition, in accordance with other exemplary embodiments of the present invention, due to the separation of various of the components of microvalve 300 from external actuator device 308, an array of microvalves 300 can be configured with a single external actuator device 308, such as a single bladder device, or any other number of external actuator devices 308 less than the number of microvalves 300, i.e., a plurality of diaphragms 304 can suitably share a single or more external actuator devices 308.

Figure 5A:
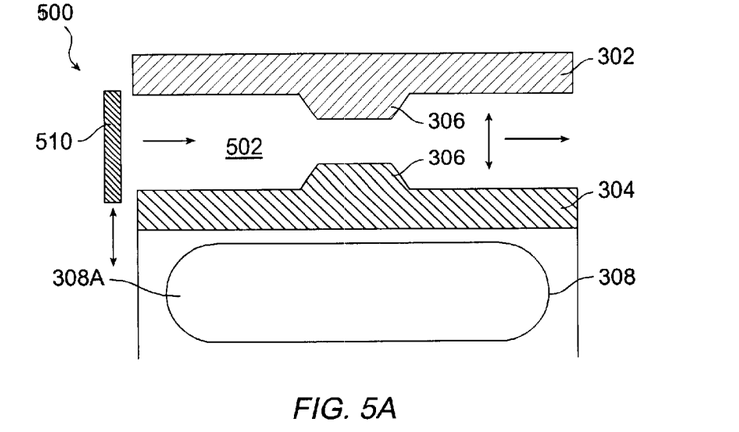
FIGS. 5A through 5C illustrate various exemplary microvalves having an additional gate valve configuration in accordance with other exemplary embodiments of the present invention.
Figure 5B:
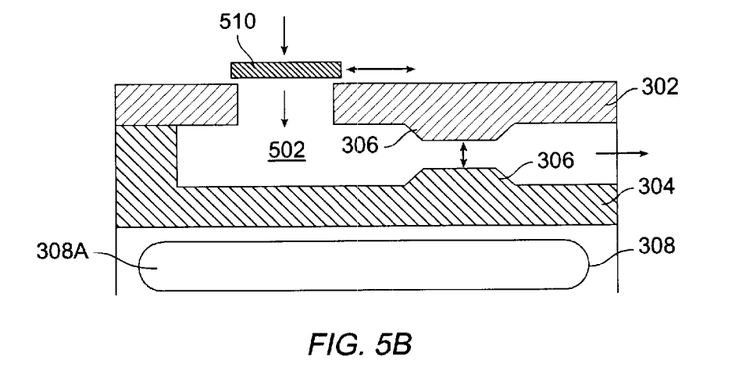
Figure 5C:
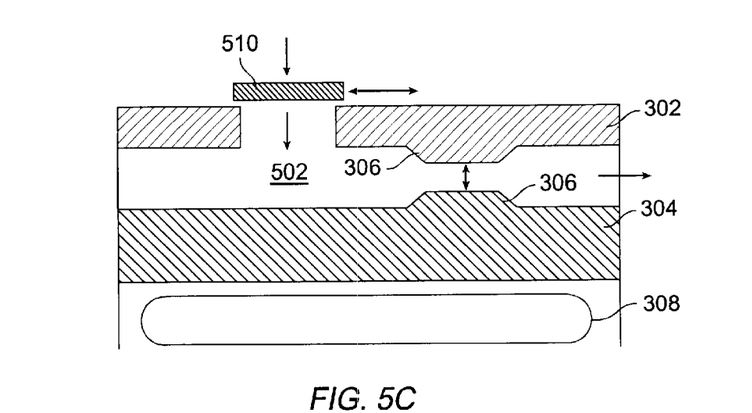

The above microvalve configurations, while maybe slightly slower in response, substantially eliminate or reduce the leak flow problems, as well as provide greater resistance and durability against back pressure problems as described above. However, in accordance with another aspect of the present invention, to address the need for high response MEMS devices, microvalve 300 can also be configured with a gate valve design to provide a fast responding regulation system that is more durable than prior art microvalves, and which permits a high bandwidth regulation of the MEMS valve. In accordance with an exemplary embodiment, with reference to FIG. 5A, an exemplary microvalve 500 suitably includes valve plate 302, diaphragm 304, external actuator device 308 and a gate device 510. In accordance with this embodiment, microvalve 500 can be configured with the various features of microvalve 300, such as unidirectional and bi-directional flow and multiple openings (as illustrated in FIGS. 4B and 4C), with multiple boss components 306 (as illustrated in FIGS. 6A through 6C) and cascaded operation. Moreover, gate device 510 can be configured within various positions to provide an entirely horizontal flow pattern, such as is illustrated in FIG. 5A, or for a combination vertical/horizontal flow pattern arrangements, such as are illustrated in FIGS. 5B and 5C.

Gate device 510 suitably comprises at least one moving gate configured on the surface of a silicon substrate with orifices, for example, on valve plate 302 and diaphragm 304 and configured to restrict the fluid flow through a passageway 502. Gate valve 510 can comprise various alloys, for example, a gate comprising a metal flap that can be actuated to cover the orifices leading to passageway 510. Further, gate valve 510 can comprise other materials, such as various ceramics, glass, e.g., pyrex-type glass, or other like materials. In addition, gate device 510 can include a shutter configuration, such as is illustrated in FIG. 2B, or other openings, which permit regulation of air flow. Moreover, because gate device 510 can be prone to leak flows as described above, the combination of gate valve 510 and diaphragm 304 operate to effectively regulate the flow despite the leaks through gate valve 510, i.e., any leaks through gate valve 510 can be suitably regulated by diaphragm 304 by restricting the flow through passageway 310.

As should now be appreciated to those skilled in the art, the present invention sets forth a microvalve that is applicable to various fluid flow applications. It will be understood that the foregoing description is of exemplary embodiments of the invention, and that the invention is not limited to the specific forms shown. Various modifications may be made in the design and arrangement of the elements set forth herein without departing from the scope of the invention. For example, rather than having the valve plate and diaphragm fabricated together, the diaphragm can be suitably pre-fabricated metal sheet that can be inserted into the microvalve. Similarly, the bladder or equivalent device can also be pre-fabricated to regulate the bias pressure and to provide for different needs and forms of actuation. In addition, for MEMS configurations having multiple microvalves, each microvalve can be comprised of different metals or other materials, for example, different diaphragm materials, or can have a bladder device actuated by different means than other microvalves within the MEMS configuration. These and other changes or modifications are intended to be included within the scope of the present invention, as set forth in the following claims.

What is claimed is:

1. A microvalve system for providing robust and durable operation within a MEMS environment, said microvalve comprising:
   a valve seat comprised of a substrate material;
   a diaphragm configured with said valve seat to define a passageway, said diaphragm comprised of said substrate material and having a boss component, said boss component having a protruding portion configured for closure of said passageway when said boss component is in juxtaposition with said valve seat; and
   an external actuation device being adjacent to said diaphragm and having an internal bias pressure, said external actuation being configured to urge said diaphragm towards said valve seat to regulate flow of fluid within said passageway; and
   an actuation mechanism for operating said external actuation device based on said bias pressure to facilitate regulation of flow fluid within said passageway.

2. The microvalve system according to claim 1, wherein said external actuation device comprises a bladder device having a fluid contained within, said bladder device being configured for expanding and contracting to urge movement of said diaphragm to regulate flow of said passageway.

3. The microvalve system according to claim 1, wherein said microvalve system is configured for bi-directional flow.

4. The microvalve system according to claim 1, wherein said valve seat comprises at least one orifice configured for allowing one of an inflow or outflow of fluid through said at least one orifice.

5. The microvalve system according to claim 4, wherein said valve seat comprises at least two orifices configured for an inflow of fluid, and at least one orifice configured for an outflow of fluid, and said passageway is defined by said valve seat, said diaphragm, and said orifices.

6. The microvalve system according to claim 1, wherein said valve seat comprises at least one orifice configured for allowing bi-directional flow of fluid through said at least one orifice.

7. The microvalve system according to claim 1, wherein said valve seat further comprises a boss component having a protruding portion configured for regulating flow of fluid in said passageway in conjunction with said boss component of said diaphragm.

8. The microvalve system according to claim 1, wherein said boss component comprises a trapezoid configuration for facilitating a reduction in non-linear characteristics through less obstruction of fluid flowing within said passageway.

9. The microvalve system according to claim 1, wherein said microvalve system comprises a plurality of microvalves cascaded in a parallel manner, each of said microvalves comprising at least one of said valve seats and said diaphragms.

10. The microvalve system according to claim 9, wherein said microvalve system comprising n microvalves having a flow rate f comprises a total flow rate of nf.

11. The microvalve system according to claim 9, wherein said plurality of microvalves are configured with a single external actuator device to facilitate movement of each diaphragm within said plurality of microvalves.

12. The microvalve system according to claim 1, wherein said microvalve system comprises a plurality of microvalves cascaded in a series manner, each of said microvalves comprising at least one of said valve seats, said diaphragms, and said external actuation devices.

13. The microvalve system according to claim 12, wherein said actuation mechanism comprises a direct means of actuation including one of an electrostatic, an electromagnetic, and a piezoelectric actuation.

14. The microvalve system according to claim 1, wherein said actuation mechanism comprises an indirect means of actuation.

15. The microvalve system according to claim 1, wherein said fluid comprises at least one of a gas, a liquid and a superheated fluid including steam.

16. The microvalve system according to claim 15, wherein said indirect means of actuation comprises one of thermal actuation.

17. The microvalve system according to claim 1, wherein said microvalve system further comprises a gate valve configuration to facilitate a high frequency response, stability and a reduction in leak flow.

18. The microvalve system according to claim 17, wherein said gate valve is coupled between one end of said valve seat and said diaphragm to further regulate fluid flow within said passageway.

19. The microvalve system according to claim 17, wherein said valve seat comprises at least one orifice, and said gate valve is configured with said at least one orifice of said valve seat to further regulate fluid flow within said passageway.

20. A microvalve for providing regulation of flow within a MEMS application, said microvalve comprising:
    a valve seat comprised of a substrate material;
    a diaphragm configured with said valve seat to define a passageway, said diaphragm comprised of said substrate material and having a boss component, said boss component having a protruding portion configured for closure of said passageway when said boss component is in juxtaposition with said valve seat; and
    an actuation device being adjacent to said diaphragm and having an internal bias pressure, said actuation device being configured to urge said diaphragm towards said valve seat to regulate flow of fluid within said passageway, said actuation device being configured for actuation by external actuation mechanisms.

21. The microvalve according to claim 20, wherein said actuation device comprises a bladder device having a fluid contained within, said bladder device being configured for expanding and contracting to urge movement of said diaphragm to regulate flow of said passageway.

22. The microvalve according to claim 20, wherein said actuation device comprises a thermal-pneumatic actuator device to urge movement of said diaphragm to regulate flow of said passageway.

23. The microvalve according to claim 20, wherein said microvalve is configured for bi-directional flow.

24. The microvalve according to claim 20, wherein said valve seat comprises at least one orifice configured for allowing one of an inflow or outflow of fluid through said at least one orifice.

25. The microvalve according to claim 20, wherein said valve seat further comprises a boss component having a protruding portion configured for regulating flow of fluid in said passageway in conjunction with said boss component of said diaphragm.

26. The microvalve according to claim 20, wherein said actuation device can be actuated by a direct means of actuation comprising one of an electrostatic, an electromagnetic, and a piezoelectric actuation.

27. The microvalve according to claim 20, wherein said actuation device can be actuated by an indirect means of actuation comprising one of thermal actuation.

28. The microvalve according to claim 20, wherein said boss component comprises a trapezoid configuration having at least one side with less than a 50° slope from a planar surface of said diaphragm to increase linear characteristics of said microvalve.

29. The microvalve according to claim 20, wherein said microvalve further comprises a latch and release device configured to lock said diaphragm in a fixed regulation position to reduce an impact of back pressure upon said diaphragm.

30. The microvalve according to claim 20, wherein said microvalve further comprises a gate valve to facilitate a high frequency response, stability and a reduction in leak flow.

31. The microvalve according to claim 30, wherein said gate valve comprises a metal flap.

32. The microvalve according to claim 30, wherein said gate valve comprises a shutter configuration.

33. The microvalve according to claim 30, wherein said gate valve is coupled between one end of said valve seat and said diaphragm to further regulate fluid flow within said passageway.

34. The microvalve according to claim 30, wherein said valve seat comprises at least one orifice, and said gate valve is configured with said at least one orifice of said valve seat to further regulate fluid flow within said passageway.

35. The microvalve according to claim 20, wherein said fluid comprises one of a gas and a liquid.

36. The microvalve according to claim 20, wherein said fluid comprises a superheated fluid including steam.

* * * * *